United States Patent Office 3,756,789
Patented Sept. 4, 1973

3,756,789
METALLURGICALLY BONDED LITHIUM/
CONDUCTIVE METAL ELECTRODE
Hanspeter Alder, Newark, Del., assignor to E. I. du
Pont de Nemours and Company, Wilmington, Del.
No Drawing. Filed Mar. 3, 1971, Ser. No. 120,764
Int. Cl. B32b 15/00
U.S. Cl. 29—194
4 Claims

ABSTRACT OF THE DISCLOSURE

A composite anodic electrode having lithium metallurgically cold bonded to a conductive metal selected from the group consisting of stainless steel, aluminum and zinc for use in nonaqueous electrolyte galvanic cells can be prepared by etching the conductive metal in a mixture of hydrochloric and nitric acids, cleaning and drying the etched conductive metal and then pressing the etched conductive metal surface into contact with a fresh lithium surface.

BACKGROUND OF THE INVENTION

(1) Field of the invention

This invention relates to the field of nonaqueous galvanic cell lithium anodes and galvanic batteries.

(2) Description of the prior art

The use of lithium metal anodes in galvanic, nonaqueous electrolyte batteries is well known. A common expedient in such battery is to utilize a composite anodic electrode comprising lithium mechanically attached to an inert conductor, i.e. a current collector. It is desirable to have the lithium in intimate electrical contact with the conductor to assure high, uniform conductivity between these components of the electrode in order to minimize IR drop in the battery caused by poor or imperfect electrical contact between the lithium and the conductor.

Superficial mechanical contact is not completely effective because the joint between the two components of the composite electrode is not inherently self-maintaining, i.e. self-supporting. Such electrodes may fail or fail prematurely, and thereby cause battery failure through loss or partial loss of the necessary intimate electrical contact between the lithium and the conductor. Physical shock to the battery may displace the lithium from the conductor, breaking the electrical contact. Such loss or partial loss of contact can also occur because an insulating film is formed on the lithium surface between the lithium and the conductor as the nonaqueous electrolyte seeps between the two surfaces. Such insulating films are known to form on lithium surfaces in certain nonaqueous electrolytes. Further, simple physical separation of the two surfaces is possible especially as the lithium anode is used up and reduced in size during battery discharge.

SUMMARY OF THE INVENTION

The present invention provides a composite galvanic cell anodic electrode consisting essentially of lithium metal metallurgically bonded to a conductive metal selected from the group consisting of stainless steel, aluminum and zinc by a process that comprises:

(a) etching the conductive metal in a mixture of aqueous hydrochloric and nitric acids;
(b) freeing the etched conductive metal of acid and any deposits formed in step (a);
(c) drying the etched conductive metal; and
(d) pressing the etched conductive metal of step (c) into contact with a freshly prepared lithium surface to form the composite anodic electrode.

Such an electrode has excellent electrical contact between the lithium anode metal and the conductor of the composite anodic electrode. Another advantage is that the composite electrode is self-supporting and thus eliminates the need for mechanical means to keep the lithium pressed against the current collector. A further advantage of such a composite electrode lies in the simplicity of its preparation.

DESCRIPTION OF THE INVENTION

The composite galvanic cell anodic electrode is prepared by a process that broadly comprises the following steps:

(1) etching the conductive metal selected from the group consisting of stainless steel, aluminum and zinc in a mixture of aqueous hydrochloric and nitric acids;
(2) freeing the etched surface of acid and any deposits formed thereon during etching;
(3) drying the surface; and
(4) pressing the etched, dried conductive metal into contact with a fresh lithium surface whereby a lithium-steel bond is formed wherein the adhesion between the lithium and the conductive metal is stronger than the cohesion within the lithium.

Broadly the stainless steels useful for the present invention include any of those that will, following such etching and pressing process, form a lithium-steel bond such that the adhesive strength is greater then the cohesive strength of the lithium. Representative useful stainless steels are, for example, those falling under the American Iron and Steel Institute (AISI) Type designations, e.g. Types 301, 302, 304, 304L, 305, 308, 316, 316L, 317, 347, 348, 430 and 502. Of these, AISI Tyles 302, 304, 316, 347, 430 and 502 are preferred because they are readily available, easily etched and form strong, lithium-steel bonds. Lithium can be adhered to surfaces of zinc of aluminum in the same manner. The bond so formed between the lithium and conductive metal is referred to as a metallurgical cold bond.

Stainless steel is the preferred conductive metal due to its high strength and conductivity, and is inert to most nonaqueous electrolytes.

The shapes of the lithium and conductive metal members to be bonded are not critical. However, for general utility, especially in batteries with stacked electrodes, sheet electrodes are conveniently prepared from conductive metal sheet stock and lithium sheet stock. Very thin conductive metal, e.g. even foil less than about .001 inch in thickness can be utilized to reduce weight and to provide flexible electrodes easily disposed in batteries. Fairly rough finished metal strips or smooth metal strips having roughness as low as 32 microinches R.M.S. (Root Mean Square), as defined at pages 596 and 597 of the American Society of Mechanical Engineers Handbook, Metals Engineering Design, 2nd ed., McGraw-Hill Book Company (1965), can be used.

The concentration of the two acids in the aqueous etching solution is not critical so long as the solution will etch the conductive metal surface in a practical period of time, e.g. in no more than 30 minutes to an hour. Suitable acid concentrations are readily determined by actual trial etching. Typical etching solutions contain from about 12% by weight of HCl and about 28% by weight of $HNO_3$ to about 17% by weight of HCl and about 38% by weight of $HNO_3$. The more concentrated of these two etching solutions is prepared conveniently by mixing equal volumes of standard concentrated aqueous hydrochloric acid (about 37% by weight of HCl) and standard concentrated aqueous nitric acid (about 70% by weight HNO₃). The more dilute solution is provided by mixing equal volumes of the two concentrated acids above with a volume of water.

Although higher and lower temperature etching processes can be utilized, the etching process is most conveniently conducted at room temperature, e.g. at from about 20 to about 30° C. The etching process comprises immersing the conductive metal surface in the etching solution for a time sufficient to produce etching visible to the naked eye. Of course, before etching, the conductive metal surface should be clean so that it is evenly wetted by the etching solution. Uniform gas evolution from such surface in the solution provides evidence both for effective etching and for a uniformly clean surface. Solvent degreasing generally affords adequate cleaning.

Following etching all that is usually required is that the conductive metal surface be washed with water, preferably distilled or deionized water, and dried. However, with some stainless steels a deposit forms on the surface of the steel during etching. Such deposit can be wiped from the surface by non-abrasive means during the water washing procedure prior to drying. Drying can be conducted conveniently and simply in air. Of course, the etched surface should be maintained free of contaminants such as oils.

The etched conductive metal surface and a fresh lithium surface are pressed together to form the desired bond. The fresh lithium surface is provided by any suitable means such as abrasion, cutting or by manually or mechanically scraping the lithium to provide a fresh, bright surface. The pressure to provide the desired adhesion can be very low, for example, about 0.1 kg. per cm.² gauge pressure. A slightly higher pressure, e.g. 1 to 2 kg. per cm.², is more effective. Still higher pressures can be used, but usually will be less than that necessary to cause cold flow in the lithium. Pressing the lithium and conductive metal together is preferably conducted in an inert, dry atmosphere, e.g. of argon, to minimize adhesion-preventing film formation on the fresh lithium surface. Pressing time of 0.1 to 5 seconds is adequate.

Whether or not the cold adhesion has been effected by the above process is readily determined by manually or mechanically separating, i.e. pulling or peeling, the bulk of the lithium from the conductive metal. If, upon such separation, lithium metal remains visibly adhering to the etched conductive metal surface, the adhesion has been achieved. This simple test may be exemplified as follows. When a knife blade is forced between a lithium sheet adequately adhered to a conductive metal sheet, a portion of the lithium will remain on the metal surface. When this knife blade test procedure effects a clean separation of the two sheets, adhesion is inadequate.

Bipolar electrodes having a lithium anode layer on one side of a conductive metal sheet and a cathode layer operably in contact with the other side of the sheet are readily prepared, e.g. by disposing the cathode layer on one side of a previously etched conductive metal sheet and then pressing the sheet into contact with a sheet of lithium as described above (see also Example 2).

BATTERIES

The present invention is not directed to any particular battery design nor, except for the lithium-on-conductive metal electrodes, to any particular battery components. Batteries wherein the composite electrodes of the present invention can be utilized are well-known in the art. For example, Rao in U.S. 3,413,154 discloses a battery wherein an electrode of the invention could be readily employed. Knight, in U.S. 3,484,290, discloses a battery of a type which could readily be adapted to utilize the mono- and bipolar invention electrodes and a wide variety of nonaqueous electrolytes and compatible depolarizing cathodes such as are disclosed, for example, by Shaw et al. in U.S. 3,393,092 and 3,393,093 by Gabano et al. in U.S. 3,511,716, by Methlie in U.S. 3,415,687 or by Eisenberg in U.S. 3,468,716.

EXAMPLES

Example 1

A sheet of AISI Type 304 stainless steel, 39 mm. x 23 mm. x 0.15 mm., was washed with trichlorotrifluoroethane and dried by evaporation. Next the sheet was immersed for 1 to 2 minutes at room temperature in a 1:1 volume mixture of 37% aqueous hydrochloric acid and 70% aqueous nitric acid. The sheet was washed free of acid with deionized water and dried in air. The dry stainless steel plate was transferred to the dry argon atmosphere of a glove box and manually pressed, at about 0.5 to 1.0 kg./cm.², against the bright, freshly scraped surface of a sheet of lithium 34 mm. x 18 mm. x 0.9 mm. The lithium adhered strongly to the steel. An attempt to peel the lithium from the steel with a knife blade resulted in separation, but lithium particles remained visibly adhering to the steel.

The following example illustrates the preparation of a bipolar electrode.

Example 2

A nickel metal mesh rectangle 35 mm. x 19 mm. was spot welded onto the center of one side of a stainless steel plate of the same composition and dimensions as that in Example 1. The stainless steel plate was then etched and dried as in Example 1. Next, a copper sulfide cathode, 20.2 mm. x 36.7 mm. x 1.0 mm., containing 1.8 g. of copper sulfide was prepared in the center of the plate as follows. About 1.9 g. of a 1:1 atom ratio mixture of sublimed sulfur powder and electrolytic copper dust, the mixture previously aged 30 days at about 25° C., was pressed into the mesh by means of a powder press to form a coherent body of the mixture. The raw cathode was then cured for 4 minutes between nickel plates maintained at 225° C. The finished cathode in contact with the stainless steel plate was cooled, transferred to the argon glove box of Example 1 and the free side of the plate manually pressed onto a sheet of lithium as in Example 1. A strong lithium-steel bond resulted. There was thus provided a bipolar electrode having a copper sulfide cathode on one side and a lithium anode on the other.

Surprisingly, despite the heating in the presence of the cathode mixture the etched stainless steel surface still formed a strong bond with the lithium.

Other cathode materials may be utilized and these may be brought into operable electrical contact with the stainless steel sheet by any of many well known procedures.

Examples 3 to 8 and comparative Examples A–D

The following examples and comparative examples as shown in the following table indicate that not all stainless steels are suitable for the present invention and show that stainless steel must be selected for operability. In all cases the stainless steel sheet stock samples were etched as in Example 1 but for 0.5 to 3 minutes, using a 1:1:1 volume ratio mixture of water, 37% aqueous hydrochloric acid and 70% aqueous nitric acid. Pressing the freshly scraped lithium sheet surface into the etched stainless steel was conducted at the indicated pressures at about 25° C. in a dry argon atmosphere.

TABLE

| Example number | AISI type stainless steel | Adhesion present at two pressing pressures [1] | |
|---|---|---|---|
| | | 0.1 kg./cm.² | 1.3 kg./cm.² |
| Comparative A | 201 | No | No. |
| Comparative B | 202 | No | No. |
| 3 | 302 | Yes | Yes. |
| 4 | 304 | Yes | Yes. |
| 5 | 316 | Yes | Yes. |
| 6 | [2] 347 | No | Yes. |
| Comparative C | 405 | No | No. |
| Comparative D | 416 | No | No. |
| 7 | 430 | Yes | Yes. |
| 8 | 502 | No | Yes. |

[1] As defined by the above described knife blade test.
[2] Manually wiped free of deposit during washing.

It should be noted that when the etching step is omitted in the above examples, the lithium fails to adhere satisfactorily to the stainless steel, and that lithium as received from the manufacturer or with a dull surface does not adhere to etched stainless steel when pressed thereto as above.

The following example demonstrates the strong, lasting adhesion of lithium to a stainless steel current collector during battery discharge.

Example 9

A 1:1 atom ratio mixture was prepared of sublimed sulfur powder and electrolytic copper dust having 50 micron maximum particle size. The mixture was aged at about 25° C. for a month. By means of a powder press, a coherent disk of the mixture was prepared in contact with a nickel metal mesh disk. Next, the coherent disk was cured for 4 minutes between two nickel plates maintained at 225° C. The resulting flat cathode disk contained 1.1 g. of copper sulfide and had a single face area of 6.5 cm.$^2$. The cathode disk was bolted, by means of a bolt previously spot welded to the nickel mesh, into a cylindrical, machined recess in a nickel plate.

A disk of AISI Type 302 stainless steel sheet stock 0.1 mm. thick was spot welded to a flat-headed bolt and then etched and dried as in Example 1. In a dry argon atmosphere this disk was pressed onto a freshly scraped disk of lithium sheet with 0.1 kg./cm.$^2$ pressure. There resulted a composite electrode, having 0.17 g. of lithium and a face area of 6.9 cm.$^2$. The composite electrode was then bolted into the recess of another nickel plate matching the cathode plate.

A cell was prepared in the argon atmosphere by bolting the two nickel plates together with insulated bolts against a polypropylene spacer ring of somewhat larger diameter than the cathode and anode recesses. Chlorinated rubber gaskets assured a tight seal between the anode and cathode plates and the spacer.

Prior to bolting the plates together, a disk of nonwoven ceramic fiber 0.4 mm. thick was disposed between the anode and the cathode within the polypropylene spacer ring. Initial anode-cathode spacing was 1.0 cm. The cell was evacuated and filled with a solution of 10 weight percent LiClO$_4$, 67 weight percent of tetrahydrofuran and 23 weight percent of 1,2-dimethoxyethane. Next, the cell was discharged through a constant resistance of 180 ohms at an average voltage of 1.58 volts to an arbitrary 1 volt cut-off. Discharge required 30 hours.

Following discharge the battery was opened for examination. The lithium was found evenly eroded and still tightly adhering to the stainless steel.

Comparative Example E

A cathode was prepared as described in Example 9. An anode was prepared as described in Example 9 but etching of the steel disk was omitted, and the lithium was used as received from the manufacturer. At 0.1 kg./cm.$^2$ pressure a superficial contact between lithium and stainless steel resulted.

After closing and filling the battery with electrolyte as described in Example 9 an open circuit voltage of 0.3 volt was measured. On discharge through a constant resistance of 180 ohms the voltage dropped immediately to below 0.1 volt.

Following discharge the battery was opened for examination. The lithium was found loose and undischarged on the anode plate. The copper sulfide cathode was unchanged.

Example 10

Strips of zinc and aluminum were etched by the procedure of Example 1, then pieces of freshly scraped lithium pressed into them. Adherence of aluminum and lithium was good, even at light (0.1 kg./cm.$^2$) pressure. Adhesion of zinc and lithium was poor at light applied pressure but very good when pressed together at 1.3 kg./cm.$^2$. Adherence was assessed by the knife blade test already described.

I claim:

1. A composite galvanic cell electrode consisting essentially of lithium metal metallurgically cold bonded to a conductive metal selected from the group consisting of stainless steel, aluminum and zinc.

2. The electrode of claim 1 wherein the conductive metal is stainless steel and is selected from the group consisting of AISI Stainless Steel Types 301, 302, 304, 304L, 305, 308, 316, 316L, 317, 347, 348, 430 and 502.

3. The electrode of claim 1 wherein the conductive metal is stainless steel and is selected from the group consisting of AISI Stainless Steel Types 302, 304, 316, 347, 430 and 502.

4. A bipolar galvanic cell electrode comprising lithium metal metallurgically cold bonded to one side of a sheet of conductive metal selected from the group consisting of stainless steel, aluminum and zinc and a cathode active depolarizing composition held in operable electrical contact with the other side of said conductive metal plate.

References Cited

UNITED STATES PATENTS

| | | | |
|---|---|---|---|
| 3,493,433 | 2/1970 | Hoffmann | 204—14 N |
| 3,506,491 | 4/1970 | Buzzelli | 136—6 |
| 3,508,967 | 4/1970 | Lyall | 136—6 |
| 3,580,828 | 5/1971 | Reddy | 204—14 |
| 3,663,721 | 5/1972 | Blondel | 136—83 |

HYLAND BIZOT, Primary Examiner

U.S. Cl. X.R.

29—195, 196, 197; 136—83